July 23, 1929.   H. R. SUMMERHAYES   1,722,181
THREE-PHASE TRANSFORMER
Filed Nov. 15, 1927
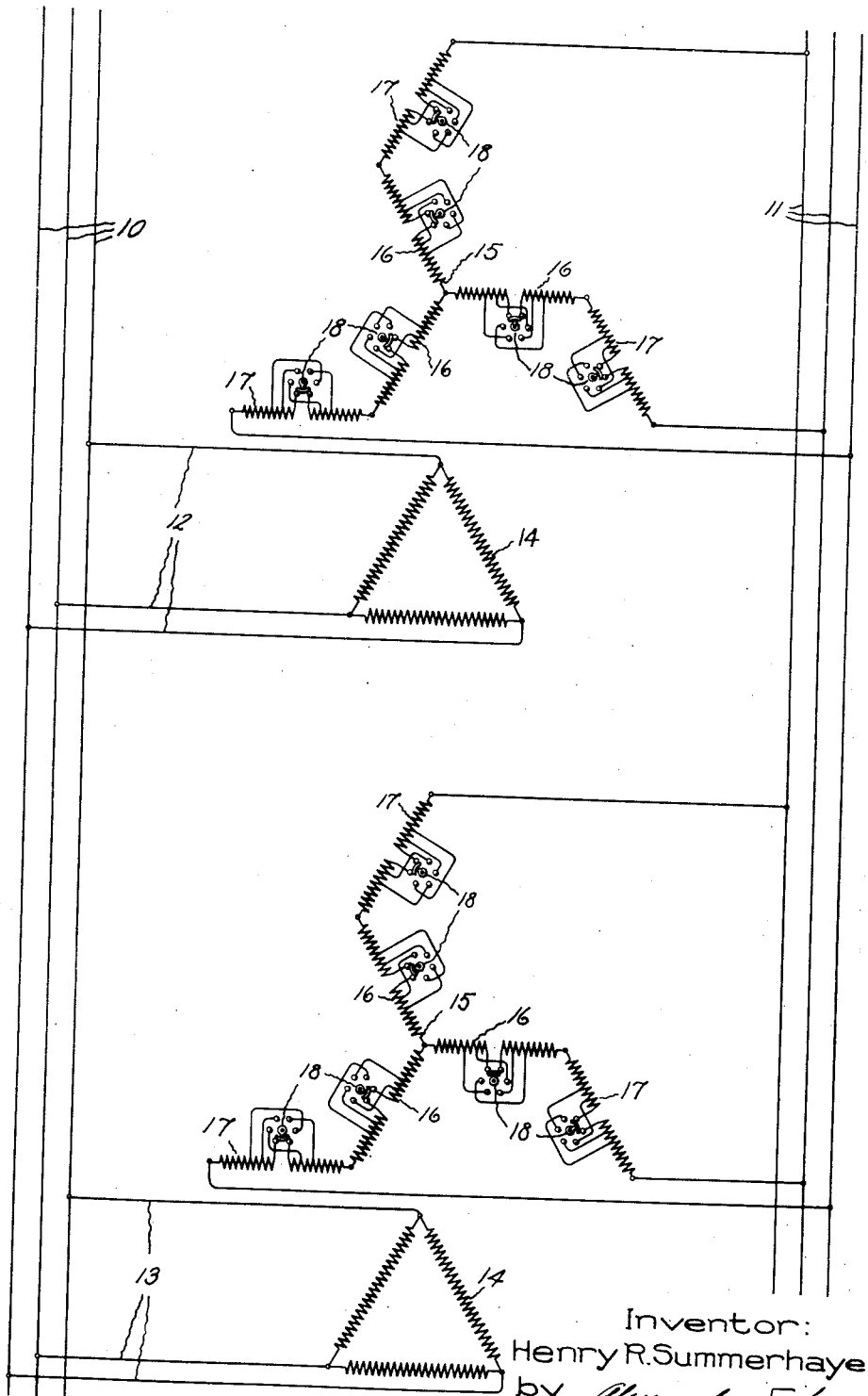
Inventor:
Henry R. Summerhayes,
by
His Attorney.

Patented July 23, 1929.

1,722,181

UNITED STATES PATENT OFFICE.

HENRY R. SUMMERHAYES, OF SCHENECTADY, NEW YORK, ASSIGNOR TO GENERAL ELECTRIC COMPANY, A CORPORATION OF NEW YORK.

THREE-PHASE TRANSFORMER.

Application filed November 15, 1927. Serial No. 233,490.

My invention relates to three-phase transformers and more particularly to transformers of this type in which at least one of the windings is Y or star-connected.

In the operation of a large electric power system, power is frequently transmitted from one point to another of the system over parallel circuits of unequal reactances and resistances. This difference in the electrical characteristics of the circuits may be because they are of unequal lengths, because they include different proportions of cable and overhead lines, or because they include transformers or other apparatus having different reactances. The relative amounts of power transmitted by two such circuits may be such that one of them may carry less than its proper proportion so that the total amount of power which can be transmitted is limited by the carrying capacity of the other circuit.

There is a similar condition where two power systems are interconnected so that power flows from one system to the other over parallel circuits which have different reactances and resistances. In this latter case, the total amount of power transmitted through the parallel connecting circuits depends on the setting of the governors of the prime movers which respectively supply power to the two systems. The relative amounts of power transmitted over the connecting circuits, however, depend on the relative reactances and resistances of the circuits and in order to make the circuits carry their proper relative amounts of power it is necessary to adjust properly the phase angle or the voltage or both of one or more of them with respect to the others. This has been commonly done by means of induction voltage regulators.

The general object of the invention is to provide a transformer having a tapped zigzag winding arranged to permit phase angle and voltage adjustment. Parallel circuits such as have been described often include one or more transformers and it is a further object of the invention to provide transformers constructed in accordance with the invention in such circuits so that the phase angles and voltages of the circuits may be adjusted to distribute the flow of power properly between the circuits.

The invention will be better understood from the following description taken in connection with the accompanying drawing which shows two transformers arranged in accordance with the invention and connected respectively into two parallel transmission circuits.

The two three-phase circuits 10 and 11 shown in the drawing, which may be parts of the same power system or parts of two separate power systems, are connected by two parallel circuits 12 and 13. Each of the circuits 12 and 13 includes a transformer having two main three-phase windings 14 and 15. The winding 15 is of the well known zigzag type in which the winding in each phase comprises two sections 16 and 17 which are connected in series and in which the voltages are in phase respectively with different phases of the other main winding 14. The voltages of the sections 16 and 17 are therefore out of phase with each other as indicated diagrammatically in the drawing. The total voltage of each phase of the zigzag winding 15 is thus the vector sum of the voltages of its two sections 16 and 17.

Each of the sections 16 and 17 of the zigzag winding 15 is provided with a plurality of taps so that the number of active turns in each of these sections may be varied as desired to change the ratio of voltage transformation of the transformer. Suitable switches 18 are preferably provided to make the desired tap connections.

With the arrangement described, it will be apparent that either the voltage ratio or the phase angle relation, or both, of the main windings 14 and 15 may be varied and adjusted as desired. If the same increase or decrease is made in the number of active turns in both winding sections 16 and 17 of each phase, the voltage ratio of the transformer will be increased or decreased without any change in the phase angle relation. The phase angle relation may be changed, however, by making an unequal change in the number of active turns in the sections 16 and 17 of each phase. It is apparent that the phase angle will be shifted in one direction if the increase in the number of active turns is greatest in the sections 17 and in the other direction if the increase is greatest in the sections 16. The phase angle may be shifted in one direction without any change in the voltage ratio of the transformer by increasing the number of active turns in the sections 17 and decreasing them to the same extent in the sections 16 while the phase angle may be shifted in the other direction without change in the voltage ratio by increasing the number of active turns in the sections 16 and decreasing them to the same extent in the sections 17. A large number of adjustments of the voltage ratio of the transformer or of the phase angle relation of its windings or both may thus be made so that the distribution of the flow of power in the parallel circuits may be controlled as desired.

The invention has been explained by describing a specific application thereof but it will be apparent that various changes may be made within the scope of the invention as defined by the appended claims.

What I claim as new and desire to secure by Letters Patent of the United States is:

1. A transformer comprising a three-phase star winding, each phase of said winding including two series connected sections arranged out of phase with each other, and each of said winding sections being provided with a plurality of taps, whereby the number of active turns in each of said sections may be changed.

2. A transformer comprising a three-phase star winding, each phase of said winding including two series connected sections arranged out of phase with each other, each of said winding sections being provided with a plurality of taps, and tap switches connected to said taps for changing the number of active turns in said winding sections.

3. A plurality of parallel connected three-phase transmission circuits, at least one of said circuits including a transformer with a three-phase star winding, each phase of said winding including two series connected sections arranged out of phase with each other, and each of said winding sections being provided with a plurality of taps, whereby the number of active turns in each of said sections may be changed.

In witness whereof, I have hereunto set my hand this 4th day of November, 1927.

HENRY R. SUMMERHAYES.